Patented Nov. 9, 1926.

1,606,501

UNITED STATES PATENT OFFICE.

LINN BRADLEY, OF MONTCLAIR, NEW JERSEY, AND EDWARD P. McKEEFE, OF PLATTS-BURG, NEW YORK, ASSIGNORS TO BRADLEY-McKEEFE CORPORATION, OF NEW YORK, N. Y., A CORPORATION OF NEW YORK.

TREATMENT OF RESIDUAL LIQUOR.

No Drawing.     Application filed May 3, 1926.  Serial No. 106,542.

This invention relates to the treatment of alkaline residual liquors from pulp producing processes, such as the soda process, the sulfate process, or a process in which caustic soda and sodium sulfite are used, particularly for the production of cooking liquors for use in pulp manufacture.

In the soda pulp process, chipped wood is subjected to digestion with caustic soda of a strength e. g. of about 10.5° to 11.5° Bé., and containing about 92% of the soda as caustic soda (most of the remainder being sodium carbonate). About 800 to 1100 gallons of such caustic soda solution are used per cord of wood (measured before chipping), and the digester is usually heated by steam to a suitable pressure, e. g. from about 90 to 140 lbs., and for a suitable period of time, for example from 3½ to 5 hours. The liquid is usually circulated within the digester during the digestion or cooking. The composition of the liquor and the time of treatment will vary somewhat according to the amount, kind, quality and condition of the material treated. The caustic soda solution used in the cooking operation is commonly made from soda ash by causticizing a solution thereof with lime. The digester is emptied at the end of the cook and the pump is separated from the residual liquor and is washed with water. The residual liquor separated from the pulp is commonly mixed with a limited amount of washings and the mixture constitutes what is commonly referred to as a black liquor.

During the digestion in the soda pulp process a very considerable amount of the materials of the wood is dissolved so that the black liquor contains a considerable amount of organic matter and various sodium compounds in solution. The black liquor thus commonly carries e. g. about 11 to 11½ grams of solids per 100 cc., and the total soda in the liquor is equivalent to about 5.75% of sodium carbonate. This determination may be made by permitting 100 cc. of the liquor to dry and igniting the residue, decomposing the organic matter and forming sodium carbonate.

The common method of treating black liquor from the soda process has been to remove a part of the water in evaporators and then feed the concentrated black liquor into an incinerator, the common type being a rotary furnace. The black liquor is further concentrated in the rotary furnace and finally "burned", organic matter being decomposed, and the inorganic matter being concentrated in the black ash, particularly as sodium carbonate. The black ash is then treated with water to dissolve sodium compounds away from the insoluble residue of carbon, etc. The resulting solution, with or without further clarification, and usually after adding a further amount of soda ash, to make up for losses which are usual in the soda process (amounting to as much as 15%), is causticized with lime. The soda is thus converted as far as practicable into sodium hydroxide or caustic soda. The lime mud is allowed to settle and the solution of caustic soda is drawn off to be used in the digester. After suitable washing the lime mud is wasted, together with a small amount of sodium compounds. The organic constituents of black liquor are consumed or carbonized in the rotary furnace. The only constituent of black liquor which is commonly recovered for reuse is the soda, the organic constituents of the liquor being destroyed or wasted.

According to the present invention the soda is recovered for reuse in the pulp mill in a simple and advantageous manner.

The residual liquors which are treated according to the present invention are such as are produced in the pulp processes mentioned above, although other liquors of similar properties can be treated. Some residual liquors contain some uncombined sodium hydroxide and some sodium carbonate together with compounds of sodium and organic materials, and may contain sodium-sulfur compounds.

In treating residual liquor according to the present invention, we subject it, preferably while hot and either with or without preliminary partial concentration, to a combined concentrating and sulfiting operation in order to remove water therefrom and to form some sulfite of sodium therein. The treatment of residual liquor with sufficient sulfur dioxide results in the conversion of such sodium hydroxide and sodium carbonate as are contained in the liquor, into sodium sulfite and in the decomposition of some sodium organic compounds, while the sodium of the sodium organic compounds thus decomposed and from which organic matter is set free, is also combined with sulfur dioxide. These soda compounds may thus be, to a considerable extent, converted into sodium sulfite, and part of the precipitable organic matter may be precipitated from the liquor. Precipitated material may be removed from the liquor in any suitable manner. By combining the sulfiting treatment with some concentrating of the liquor, there is produced directly a somewhat concentrated liquor in which the soda is present to the desired extent, as a sulfite of sodium.

The sulfiting operation can be carried to the desired extent so that a part only of the reactive alkaline compounds of the residual liquor is sulfited, or until all or practically all of the reactive sodium compounds are converted into sodium sulfite, or the operation may even be continued beyond the monosulfite stage until some acid sulfite or bisulfite is formed. When some bisulfite is formed, this liquor can be utilized as it is or it can be neutralized e. g. with sodium carbonate, or with added alkaline residual liquors and resulting further production of sodium sulfite.

Instead of simply sulfiting the liquor, it may be simultaneously sulfited and carbonated by spraying the liquor into a gaseous atmosphere containing both sulfur dioxide and carbon dioxide. When a gaseous mixture containing both carbon dioxide and sulfur dioxide is passed through a tower or chamber into which residual liquor is sprayed, the liquor will be acted upon by both gases and alkaline compounds may be in part converted into sulfite and in part into carbonate. By regulating the sulfiting and carbonating operations, a somewhat concentrated liquor can be produced from which some organic matter has been set free and which contains a regulated amount of sodium sulfite and some carbonate. By treating such a solution with lime in regulated amount, the carbonate only may be causticized, giving a solution containing caustic soda and sodium sulfite, or by using more lime sodium sulfite may also be causticized, with the resulting production of a solution containing more caustic soda, and of precipitates containing calcium carbonate and calcium sulfite.

For example, in carrying out the combined concentrating and sulfiting operation of the present invention, we may spray or atomize or shower the residual liquor into an atmosphere of hot gases containing sulfur dioxide, or containing sulfur dioxide and carbon dioxide, either with or without partially concentrating by any other means, so that evaporation of water of the liquor will take place simultaneously with the action of sulfur dioxide (or of sulfur dioxide and carbon dioxide) upon the liquor, with resulting sulfiting of soda. The concentrating process of the present invention brings about a concentration of residual liquor by gases and thus may be carried out with waste heat, such as that of hot flue gases or hot products of combustion or other gases containing sulfur dioxide, or sulfur dioxide and carbon dioxide, into which the liquor is atomized or sprayed or showered or otherwise subjected to the action thereof. The process is thus one of marked advantage, the concentrating of the liquor and the sulfiting (or sulfiting and carbonating) being carried out simultaneously.

Various kinds of apparatus are available for operating the process of the present invention. Residual liquor can be pumped to the top of a sulfiting tower and atomized into the tower e. g. with a blast of gas or air; or discharged against a splash device for breaking up the liquor into a finely divided state; or the liquor can be forced thru a spray nozzle or thru a series of small inlet pipes or passages thru which the liquor is discharged in small streams which break up into small drops or droplets. The atomized or showered liquor, e. g. in the form of a mist or rain, by falling thru the gaseous current in the sulfiting tower or chamber will be brought into intimate contact with these gases, with resulting evaporation of part of the water of the liquor and reaction of the sulfur dioxide of the gases with constituents of the liquor in the manner above described. Heated gases may be taken directly from a furnace or combustion chamber in which they are produced, and advantage thus taken of their elevated temperature. If the gases available are not at a sufficiently high temperature, they can be further heated to promote the concentration of the liquor. The concentrated and sulfited liquor will collect at the bottom of the sulfiting tower or chamber and if it has not been sufficiently concentrated and sulfited, can be reintroduced into the sulfiting tower or chamber, or it can be introduced into another sulfiting tower or chamber where it will undergo further sulfiting and concentrating. A series of towers or chambers may be provided into which residual liquor is sprayed or atomized successively and in which the concentrating and sulfiting progressively take place. The liquor can thus be brought to the desired degree of concentration, and precipitable organic matter precipitated therefrom, with conversion of corresponding reactive soda of the liquor into a sulfite of sodium. If desired the liquor thus produced can be directly causticized with lime, preferably after the separation of suspended organic matter, to give a concentrated and causticized liquor. By the addition thereto of caustic soda, sodium sulfide, or of soda ash, or other causticizable sodium salt before causticizing, to make up for losses and supply sufficient reactive soda, the regenerated cooking liquor is available for reuse.

The organic matter set free from the liquor can be removed by any suitable means. Suspended organic matter can be removed from the liquor and can be dried and used for various purposes. For example, it can be subjected to destructive distillation, giving gaseous and liquid products, and a residue of charcoal.

The liquor from which organic matter has been thus removed will be a somewhat concentrated liquor, the degree of concentration of which can be regulated. It may thus be concentrated to such a degree as will correspond with that required in the digester, so that, after causticizing, and adjusting, it can be directly returned to the digester; or the solution can be still further concentrated to give a more concentrated liquor, and thereafter diluted with some wash water. A further amount of soda ash or sodium sulfite can be added to the liquor before causticizing to make up for losses, or caustic soda or other suitable material can be added to the liquor either before or after the liquor has been causticized.

If desired a sulfite of sodium may be crystallized out of the solution upon cooling a sufficiently concentrated and sulfited liquor. Such crystals may be dissolved and the solution treated with lime to produce a solution of sodium sulfite and caustic soda. The calcium sulfite produced by the causticizing operation can be treated in various ways, for example, with sulfuric acid or nitre cake (acid sodium sulfate), and the sulfur dioxide set free can be used over again in the process. If nitre cake is used for treating the calcium sulfite, some sulfite of sodium may be produced in addition to sulfur dioxide and this sulfite of sodium, (e. g. separated from calcium sulfate) can be added to the concentrated liquor before or after causticizing for the purpose of supplying soda and sulfite to make up for losses in the process, or for the purpose of giving an increased amount of caustic soda when added prior to the causticizing step.

Residual liquor often contains a considerable amount of sodium acetate. If the causticized liquor is sufficiently concentrated, and sufficient sodium acetate is present, sodium acetate will, to some extent, separate out from the liquor on cooling, and can thus be recovered. Such amounts of sodium acetate as are not separated out remain in the liquor and can be returned to the digester. If the concentration of the causticized liquor is not carried sufficiently far to cause separation of sodium acetate, it may remain in the causticized liquor and be returned to the digester, unless it has been otherwise removed.

If sodium acetate is not produced in sufficient amount during one digestion to make it advisable to then recover it from the residual liquor, it can be returned with the causticized liquor to the digester and permitted to build up, by returning the liquor one or more times, until there is enough sodium acetate in the black liquor produced by a subsequent operation to make it advisable to separate it, or to separate out the excess thereof. That is, sodium acetate can be permitted to remain in the liquor returned to the digester, and the liquor treated for the removal of acetate only after an accumulation thereof has taken place during two or more digestion operations. The black liquor can thus be freed from a portion of its organic matter and concentrated and sulfited and returned to the digester, and the liquor from the operation in which such returned liquor is used can be treated for the removal or separation of acetate from the cycle, or it can be again returned to the digester and the liquor produced from a subsequent operation treated for this purpose, depending upon the amount of sodium acetate which the original liquor and the successive liquors contain. In so far as sodium acetate may undergo change in the digester to a causticizable soda compound, the treatment of the modified or changed black liquor with lime may convert such compound into caustic soda which is thus made available in the further carrying out of a pulp producing process or otherwise.

When the cooking liquor from which the residual liquor is produced contains caustic soda and sodium sulfur compounds, such as sodium sulfite, it can be treated in a similar way to that above described, e. g. by spraying it into a hot gaseous current containing sulfur dioxide, or containing both sulfur dioxide and carbon dioxide, to concentrate the liquor and to decompose sodium organic matter and to give a concentrated liquor containing a sulfite of sodium or both sodium sulfite and carbonate.

Where the concentrated and sulfited liquor is desired for use in a process in which a sulfite of sodium is used in the cooking liquor, the sodium sulfite produced by the sulfiting operation can be directly used, either to form the cooking liquor or to form part of the cooking liquor. Where it is desired to use a cooking liquor containing both caustic soda and sodium sulfite, the liquor can be sulfited to the desired extent and then causticized to the desired extent to give a regulated amount or content of caustic soda and of sodium sulfite in the liquor.

When the residual liquor is concentrated by means of hot gases containing both sulfur dioxide and carbon dioxide and the proportion of carbonate and sulfite is regulated, causticizing of the liquor to convert sodium carbonate into caustic soda will give a liquor containing caustic soda and sodium sulfite, or the sodium sulfite also may be causticized to some extent to give a cooking liquor of proper proportions of caustic soda and sodium sulfite.

It will thus be seen that the present invention includes a simple and advantageous method of treating residual liquor in which the liquor is subjected to a combined concentration and sulfitation, with decomposition of sodium organic matter and conversion of reactive soda compounds into a causticizable form (e. g. sodium sulfite) so that a somewhat concentrated liquor will be directly produced and which can be used without causticizing or after being causticized, (preferably after separation of uncombined organic matter) to give a causticized soda solution available for reuse.

Cooking liquor may be used which is acid to litmus, e. g. containing mixtures of sodium sulfite and sodium bisulfite, the amount of total $SO_2$ as well as combined $SO_2$ being sufficient to cook the wood to the desired degree. Around 20 to 25 parts $SO_2$ per 100 parts wood (bone dry basis) generally being sufficient to yield pulp of excellent quality.

Cellulosic materials other than wood may be treated and the residual liquor subjected to operations similar to those described for residual liquors resulting from cooking wood chips.

This application is a continuation in part of our prior application Serial No. 470,963 filed May 19, 1921.

We claim:

1. The method of treating alkaline residual liquor, which comprises simultaneously concentrating and sulfiting the liquor by bringing the liquor into contact with a current of gases containing sulfur dioxide.

2. The method of treating alkaline residual liquor, which comprises simultaneously concentrating and sulfiting and carbonating the liquor and decomposing alkaline organic compound therein by bringing the liquor into contact with a current of gases containing sulfur dioxide and carbon dioxide.

3. The method of treating alkaline residual liquor which comprises spraying the liquor into a gaseous current containing sulfur dioxide and simultaneously evaporating water from the liquor and sulfiting the liquor.

4. The method of treating alkaline residual liquor which comprises concentrating and sulfiting and carbonating the liquor by spraying the liquor into a current of gas containing sulfur dioxide and carbon dioxide.

5. The method of treating alkaline residual liquor which comprises atomizing or spraying or showering the liquor into a heated atmosphere containing sulfur dioxide which will decompose alkaline organic matter in the liquor whereby the liquor is simultaneously concentrated and organic matter is set free.

6. The method of treating alkaline residual liquor which comprises spraying the liquor into a current of a gas containing sulfur dioxide and simultaneously evaporating water from and sulfiting the liquor, removing organic matter therefrom and causticizing the resulting liquor by treatment with an alkaline earth hydroxide.

7. The method of treating alkaline residual liquor, which comprises atomizing or spraying or showering the same into a heated atmosphere containing sulfur dioxide and capable of forming causticizable sodium salts thereby simultaneously concentrating the liquor and separating organic matter therefrom and producing a solution of sodium salts causticizable with lime and subjecting the resulting concentrated liquor with reduced organic content to causticizing to give a concentrated caustic soda solution available for re-use.

8. The method of treating alkaline residual liquor which comprises simultaneously concentrating the same and precipitating organic matter therefrom by bringing the liquor into contact with hot gases containing sulfur dioxide.

9. The method of treating alkaline residual liquor, which comprises simultaneously concentrating the liquor and precipitating organic matter therefrom by bringing the liquor into contact with hot gases containing sulfur dioxide, adding to the concentrated liquor a causticizable sodium compound to make up for losses of soda and causticizing the resulting liquor for reuse.

10. The method of treating alkaline residual liquor which comprises simultaneously concentrating and sulfiting the liquor and precipitating organic matter therefrom by bringing the liquor into contact with a gaseous current containing sulfur dioxide and subjecting the sulfited liquor to a regulated causticizing treatment to produce a liquor containing caustic soda and sodium sulfite.

11. The method of treating alkaline residual liquor which comprises subjecting the liquor to a simultaneous concentrating, sulfiting and carbonating treatment by bringing the liquor into contact with a gaseous current containing sulfur dioxide and carbon dioxide, and subjecting the resulting liquor to a regulated sulfiting treatment to produce a liquor containing caustic soda and sodium sulfite.

12. The method of treating alkaline residual liquor which comprises simultaneously concentrating and sulfiting the liquor and precipitating organic matter therefrom by bringing the liquor into contact with a gaseous current containing sulfur dioxide, separating organic matter from the liquor prior to causticizing, and subjecting the sulfited liquor to a regulated causticizing treatment to produce a liquor containing caustic soda and sodium sulfite.

13. The method of treating alkaline residual liquor which comprises subjecting the liquor to a simultaneous concentrating, sulfiting and carbonating treatment by bringing the liquor into contact with a gaseous current containing sulfur dioxide and carbon dioxide, separating organic matter from the liquor prior to causticizing, and subjecting the resulting liquor to a regulated causticizing treatment to produce a liquor containing caustic soda and sodium sulfite.

14. The method of preparing a cooking liquor which comprises simultaneously sulfiting and concentrating an alkaline residual liquor and producing a solution which contains a mixture of sodium sulfite and sodium bisulfite, by bringing the liquor into contact with a current of gases containing sulfur dioxide until such a mixture has been produced.

In testimony whereof we affix our signatures.

LINN BRADLEY.
EDWARD P. McKEEFE.